(No Model.)
J. F. MORRISON.
FENCE POST.
No. 258,459. Patented May 23, 1882.
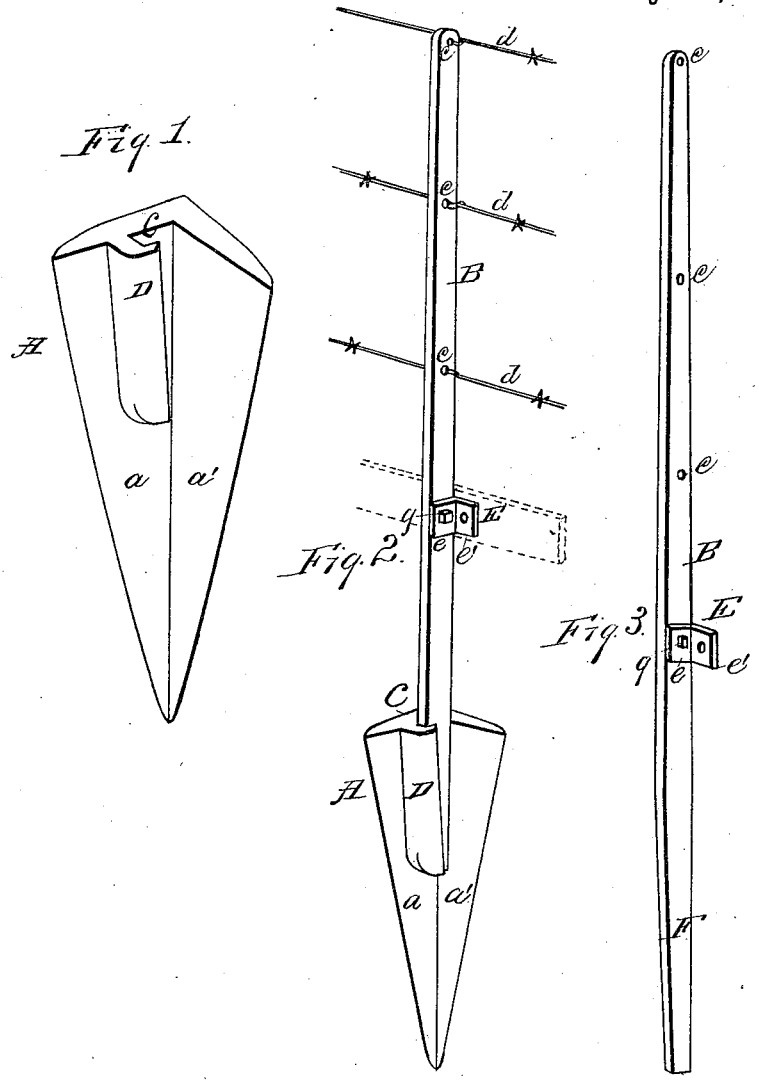
Witnesses:
E. G. Amus.
J. E. Peck.
Inventor:
Joseph F. Morrison

UNITED STATES PATENT OFFICE.

JOSEPH F. MORRISON, OF FORT ATKINSON, WISCONSIN.

FENCE-POST.

SPECIFICATION forming part of Letters Patent No. 258,459, dated May 23, 1882.

Application filed April 4, 1881. (No model.)

*To all whom it may concern:*

Be it known that I, JOSEPH F. MORRISON, of Fort Atkinson, in the county of Jefferson and State of Wisconsin, have invented a new and useful Improvement in Fence-Posts, of which the following is a specification.

The invention consists in a fence-post socket formed of two blades, $a$ and $a'$, at substantially right angles to each other, and a hooked flange, as hereinafter set forth.

Figure 1 is a perspective view of the socket-point. Fig. 3 is a perspective view of the post. Fig. 2 is a perspective view of the socket-point with the post inserted into the socket, also three sections of barbed wire, and one board in position to be secured to the post.

The triangular point A, Fig. 1, is constructed with two angular blades, $a$ and $a'$, located at a right angle with each other, having their edges sharpened, and on a line converging to and uniting in one point, while the upper ends are left square.

The hooked flange D is cast solid with blade $a$, with the hook turned toward blade $a'$, its length extending downward nearly parallel with it and converging toward it sufficient to form a socket or receptacle between the hook and blade $a'$ for the reception of the lower end of post B, as shown in Fig. 2. Post B, Fig. 3, tapers a short distance at the lower end to fit into the socket C; also, from the socket upward the post has a gradual taper for the purpose of retaining strength with the least weight.

$e$ and $e'$, Figs. 2 and 3, is a right-angle corner iron or bracket, secured to post B by bolt $g$. E is a board in position for being secured by a bolt passing through the hole in bracket $e'$.

$c\ c\ c$, Fig. 3, are holes through post B, into which wires are placed and twisted about the barbed wires $d$ for fastening them to the post, as in Fig. 2. The barbed wires are allowed to slide in the twisted clasps for the purpose of adjustment.

The board E is designed for stopping small animals, to be used only when desired for that purpose.

When wire alone is used the fence can be moved from one place to another by removing the posts from their sockets, laying the fence upon its side, and winding or rolling it upon a reel for transportation. When desired to be set up again, unwind it upon the desired line, so the foot of the posts will indicate where to drive the sockets, which is done by placing a wooden block upon its square top and driving with an ax or sledge, then raising the fence and inserting the posts in their sockets, straining and fastening the wires, which slide easily in their clasps, and the work is complete.

The blades which form the sockets, it will be observed, are to give strength with the least weight and cost, and also to give surface to resist the force of the wind or other pressure liable to force the post from position.

Having fully described my invention, what I claim as new, and desire to secure by Letters Patent, is—

In fence-posts, the socket A, consisting of two blades, $a$ and $a'$, at substantially right angles to each other, and the hooked flange D, as set forth.

JOSEPH F. MORRISON. [L. S.]

Witnesses:
 THOMAS CRANE,
 H. A. PORTER.